(12) United States Patent
Cripe

(10) Patent No.: US 8,089,786 B1
(45) Date of Patent: Jan. 3, 2012

(54) REDUCED-LOSS POLYPHASE RESONANT POWER CONVERTER

(75) Inventor: David W. Cripe, Mount Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 407 days.

(21) Appl. No.: 12/456,521

(22) Filed: Jun. 18, 2009

(51) Int. Cl.
*H02J 1/02* (2006.01)
*H02M 1/12* (2006.01)
*H02M 1/14* (2006.01)

(52) U.S. Cl. .......................... 363/39; 363/45
(58) Field of Classification Search .............. 363/39–42, 363/44–48
See application file for complete search history.

(56) References Cited

U.S. PATENT DOCUMENTS

| | | | | |
|---|---|---|---|---|
| 3,909,700 A | * | 9/1975 | Ferro | 363/147 |
| 3,944,749 A | | 3/1976 | Kahn | |
| 3,952,251 A | | 4/1976 | Kahn | |
| 4,053,820 A | * | 10/1977 | Peterson et al. | 363/44 |
| 4,164,714 A | | 8/1979 | Swanson | |
| 4,366,532 A | * | 12/1982 | Rosa et al. | 363/45 |
| 4,730,243 A | * | 3/1988 | Glennon | 363/44 |
| 4,914,561 A | * | 4/1990 | Rice et al. | 363/126 |
| 5,499,178 A | * | 3/1996 | Mohan | 363/39 |
| 5,508,903 A | * | 4/1996 | Alexndrov | 363/16 |
| 6,842,069 B2 | * | 1/2005 | Takahashi et al. | 363/39 |
| 7,983,063 B2 | * | 7/2011 | Lu et al. | 363/39 |
| 2006/0056207 A1 | * | 3/2006 | Sarlioglu | 363/44 |
| 2008/0298093 A1 | * | 12/2008 | Jin et al. | 363/21.06 |

OTHER PUBLICATIONS

Li, Jieli, et al., "Coupled-Inductor Design Optimization for Fast-Response Low-Voltage DC-DC Converters", IEEE Applied Power Electronic Conference, Mar. 2002; pp. 1-8; IEEE 2002.

* cited by examiner

*Primary Examiner* — Jue Zhang
(74) *Attorney, Agent, or Firm* — Donna P. Suchy; Daniel M. Barbieri

(57) ABSTRACT

The present invention is a polyphase, resonant switching power converter which includes a transformer structure configured for minimizing converter-frequency ripple at both an input and output of the power converter. The power converter is further configured for maximizing frequency response of an output signal provided by the power converter. The power converter further provides an electrically efficient system for providing a modulated supply voltage/power signal (ex.—the output signal) to power amplifiers which utilize EER or other techniques requiring modulated supply voltage.

20 Claims, 5 Drawing Sheets

| # Switches | Ripple Freq. | Ripple Amplitude |
|---|---|---|
| 1 | 1 | 1 |
| 2 | 2 | 0.212 |
| 3 | 6 | 0.00606 |
| 4 | 4 | 0.021 |
| 5 | 10 | 0.0012 |
| 6 | 6 | 0.00606 |
| 7 | 14 | 0.00047 |
| 8 | 8 | 0.0025 |
| 9 | 18 | 0.00022 |

*FIG. 3*

REDUCED-LOSS POLYPHASE RESONANT POWER CONVERTER

FIELD OF THE INVENTION

The present invention relates to the field of advanced radio systems and particularly to a reduced-loss polyphase resonant power converter.

BACKGROUND OF THE INVENTION

Current power converters may not provide a desired level of performance.

Thus, it would be desirable to provide a power converter which obviates problems associated with current solutions.

SUMMARY OF THE INVENTION

Accordingly, an embodiment of the present invention is directed to a power converter, including: an input configured for receiving an input power/input voltage; an output configured for providing a modulated power signal based upon the received input power/input voltage; a plurality of power switch-rectifier pairs connected between the input and the output; and a plurality of coupling transformers connected to the plurality of power switch-rectifier pairs, each of the plurality of coupling transformers including a primary winding, a secondary winding, a tertiary winding, and a quarternary winding, a tertiary winding of a first transformer included in the plurality of transformers being series-connected with a tertiary winding of a second transformer included in the plurality of transformers, a quarternary winding of a first transformer included in the plurality of transformers being series-connected with a quarternary winding of a second transformer included in the plurality of transformers, wherein the series-connected tertiary windings and the series-connected quarternary windings are configured for promoting a reduction of ripple voltage in a neutral star point voltage of the power converter primary and secondary windings respectively, and cancellation of magnetic flux within the plurality of transformer cores.

An additional embodiment of the present invention is directed to a power converter, including: an input configured for receiving an input power/input voltage; an output configured for providing a modulated power signal based upon the received input power/input voltage; a plurality of power switch-rectifier pairs connected between the input and the output; a plurality of coupling transformers connected to the plurality of power switch-rectifier pairs, each of the plurality of coupling transformers including a primary winding, a secondary winding, a tertiary winding, and a quarternary winding, a tertiary winding of a first transformer included in the plurality of transformers being series-connected with a tertiary winding of a second transformer included in the plurality of transformers, a quarternary winding of a first transformer included in the plurality of transformers being series-connected with a quarternary winding of a second transformer included in the plurality of transformers; and a plurality of low RF-impedance capacitors connected to the plurality of coupling transformers at the tertiary and quarternary windings of the transformers respectively, the low RF-impedance capacitors configured for allowing the power converter to possess low impedance at a switching frequency of the power converter, wherein the series-connected tertiary windings and the series-connected quarternary windings are configured for promoting a reduction of ripple voltage in a neutral star point voltage of the power converter.

A further embodiment of the present invention is directed to a power converter circuit, including: an input; an output; a plurality of power switch-rectifier pairs connected between the input and the output; a plurality of coupling transformers connected to the plurality of power switch-rectifier pairs, each of the plurality of coupling transformers including a primary winding, a secondary winding, a tertiary winding, and a quarternary winding, a tertiary winding of a first transformer included in the plurality of transformers being series-connected with a tertiary winding of a second transformer included in the plurality of transformers, a quarternary winding of a first transformer included in the plurality of transformers being series-connected with a quarternary winding of a second transformer included in the plurality of transformers; a plurality of filter inductors, said filter inductors connected to the plurality of coupling transformers, said filter inductors configured for blocking RF current flow from the input and the output of the power converter circuit; a plurality of low RF-impedance capacitors connected to the plurality of coupling transformers, the plurality of low RF-impedance capacitors configured for allowing the power converter circuit to possess low impedance at a switching frequency of the power converter circuit; and a plurality of resistors connected to the plurality of low RF-impedance capacitors, wherein the capacitors are shunted with resistances of the plurality of resistors for splitting an input current and an output current between the resistors and the tertiary and quarternary windings of the first and second transformers for promoting current and flux balance in cores of the first and second transformers, wherein the series-connected tertiary windings and the series-connected quarternary windings are configured for promoting a reduction of ripple voltage in a neutral star point voltage of the power converter circuit.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 3 is a table illustrating the effect of the number of switches implemented in a power modulator on normalized output ripple and frequency in accordance with an additional exemplary embodiment of the present invention.

DETAILED DESCRIPTION OF THE INVENTION

Figure 1A:
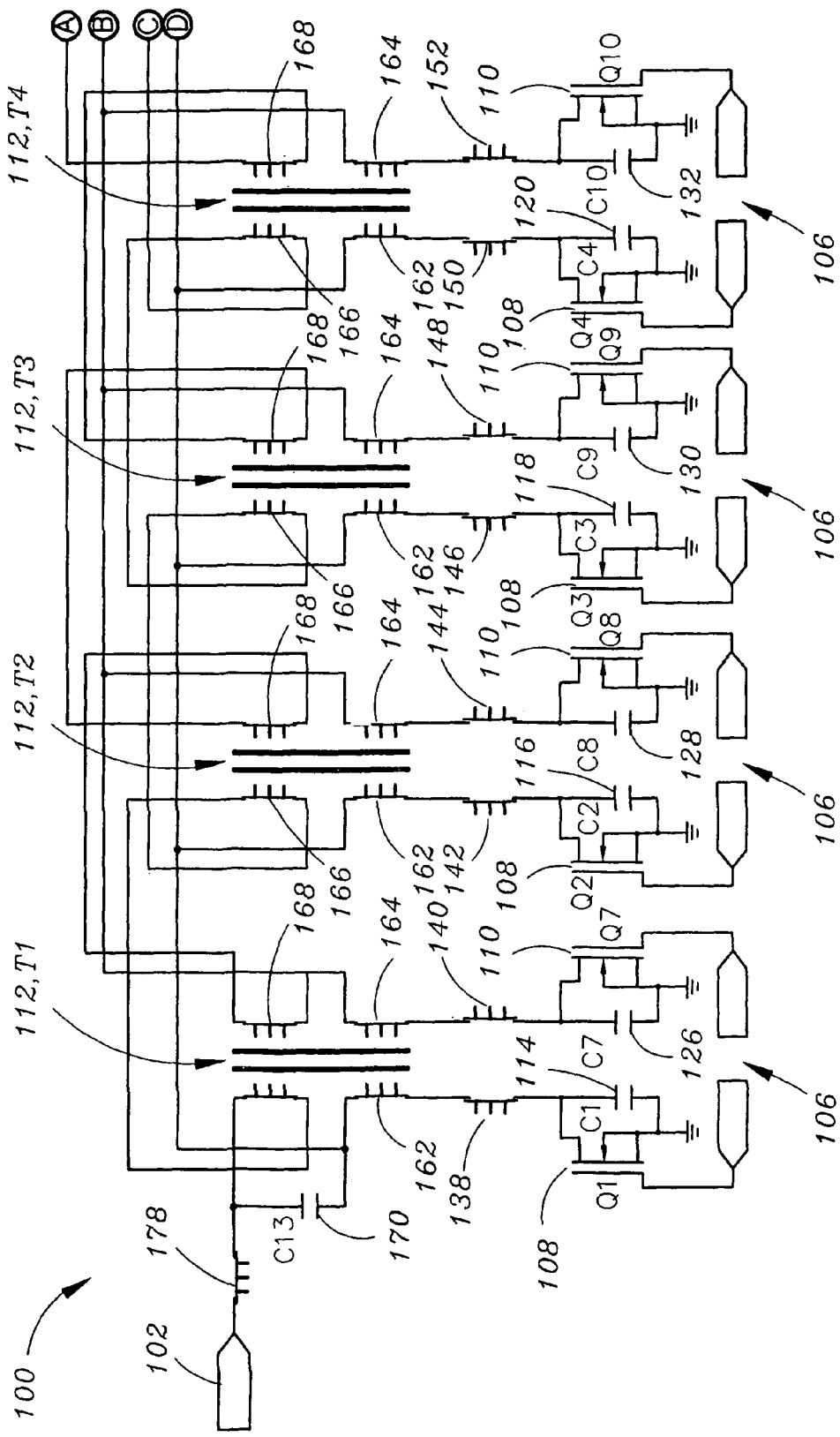
FIGS. 1A and 1B are a block diagram schematic of a multi-phase resonant power modulator in accordance with an exemplary embodiment of the present invention.

Reference will now be made in detail to the presently preferred embodiments of the invention, examples of which are illustrated in the accompanying drawings.

Techniques for improving the efficiency of Radio Frequency (RF) linear power amplifiers through the use of Envelope Elimination and Restoration (EER) may be implemented. While generally serviceable in the context of simple, non-suppressed-carrier amplitude modulation formats, other modulation formats such as single-sideband voice formats and many digital formats may require generation of an envelope power modulation signal with a bandwidth much greater than that of the baseband signal. When simple Pulse Width Modulation/Pulse Width Modulated (PWM) power amplification circuitry is used for the power modulator, the highest modulation frequency may generally be an order of magnitude lower than the PWM frequency. This may be due to a requirement that the output filter be capable of attenuating the PWM frequency present at the output of the switching device to a suitable level below the amplitude of the signal to be amplified.

In further implementations, multiple PWM amplifiers may be combined, such that each of the PWM amplifiers may have its drive signal delayed with respect to all others by a sub-multiple of three hundred-sixty (360) degrees. Such implementations may serve to effectively multiply the PWM ripple frequency by the number of amplifiers thus combined, and may further serve to reduce their amplitudes proportionately as well. The use of PWM amplifier circuits may be limited by switching losses in Metal-oxide-semiconductor field-effect transistors (MOSFETS) to a switching frequency of perhaps one Megahertz (1 MHz). Frequency response of the amplifier as a whole may be limited by an output low-pass filter, which may have the topology of a choke-input ladder filter. A minimum value for a first choke in the network may be referred to as the critical inductance (ex.—the minimum value of choke such that the peak ripple current through the choke never exceeds the direct current (DC) through the choke for any condition of PWM duty). This minimum value (ex.—the critical inductance, Lcrit) may be given by:

$$Lcrit = Rload/2/Freq$$

where Rload is the load resistance terminating the low-pass filter, and Freq is the PWM frequency. The use of a multi-phase power converter, which results in reduced amplitude PWM ripple, may allow the increase in bandwidth of the PWM filter, and consequently, may provide improvement in bandwidth of the output signal.

Use of a poly-phase transformer or choke to combine PWM outputs at the input to the low-pass filter may serve to divide the amplitude of the n-multiple PWM signals by the factor 'n', and may effectively multiply the frequency by 'n' as well. This may have the effect of reducing the value of Lcrit by a factor of $n^2$.

An upper limit for the frequency of operation of a PWM power converter may be established by frequency-proportional switching losses present in the PWM switching element, and may further be established by losses in the gate drive circuitry of the MOSFET switch. Various resonant and quasi-resonant switching converter topologies may be implemented to ameliorate switching losses of a power converter circuit. A single-ended, push-pull, dual-resonant converter may be implemented which substantially eliminates the power converter circuit's switching losses, and permits an efficient, resonant sine-wave drive of the switching MOSFET gates. Such a circuit may allow order-of-magnitude increases in operating frequency over those of a number of square-wave PWM power converters, and which, depending on the switching element selected, may approach low-Very High Frequencies (VHF). Resonant switching power conversion circuits may still require low-pass filtering of the output for the ripple rejection, limiting their possible bandwidth as power modulators.

Further, a dual-resonant power converter may implement a first pair of power MOSFETs, driven in push-pull, which may be connected to their drains by an output coupling transformer. A secondary winding may connect across a second pair of power MOSFETs of the power converter. The second pair of power MOSFETs may also driven in push-pull and may operate as synchronous rectifiers. A primary-side/primary sub-circuit of the coupling transformer and a secondary-side/secondary sub-circuit of the coupling transformer may be center-tapped and connected to choke(s). Input power may be provided to a primary-side choke, output power may be drawn from a secondary-side choke. Because voltage waveforms at the transformer center-taps may be twice the frequency and half the amplitude of what would be present with a single-switch converter, the value of the primary and secondary center-tap chokes may be reduced four-fold over a single-switch converter. Similarly, a maximum bandwidth of modulation may be increased four-fold over a single-switch converter. Further improvement in output bandwidth may be achieved by combining additional switch-rectifier pairs into a polyphase configuration. However, it may be critical to do so in such a manner that the impedances between switches are symmetrical, so that optimum reduction of ripple voltage may be attained.

The present invention may provide a system/power converter/power modulator which effectively combines multiple, dual-resonant power switch-rectifier pairs in a polyphase array to allow for power conversion with substantial reduction of input and output ripple signals. Further, the power modulator of the present invention may reduce the requirement for input and output low-pass filtering, thus permitting the bandwidth of the power modulator to approach an operating frequency of implemented switching devices. An integrated transformer structure of the power modulator may include a combination of one or more of: coupling transformers; resonator inductors; input filter chokes; and output filter chokes.

Figure 1B:
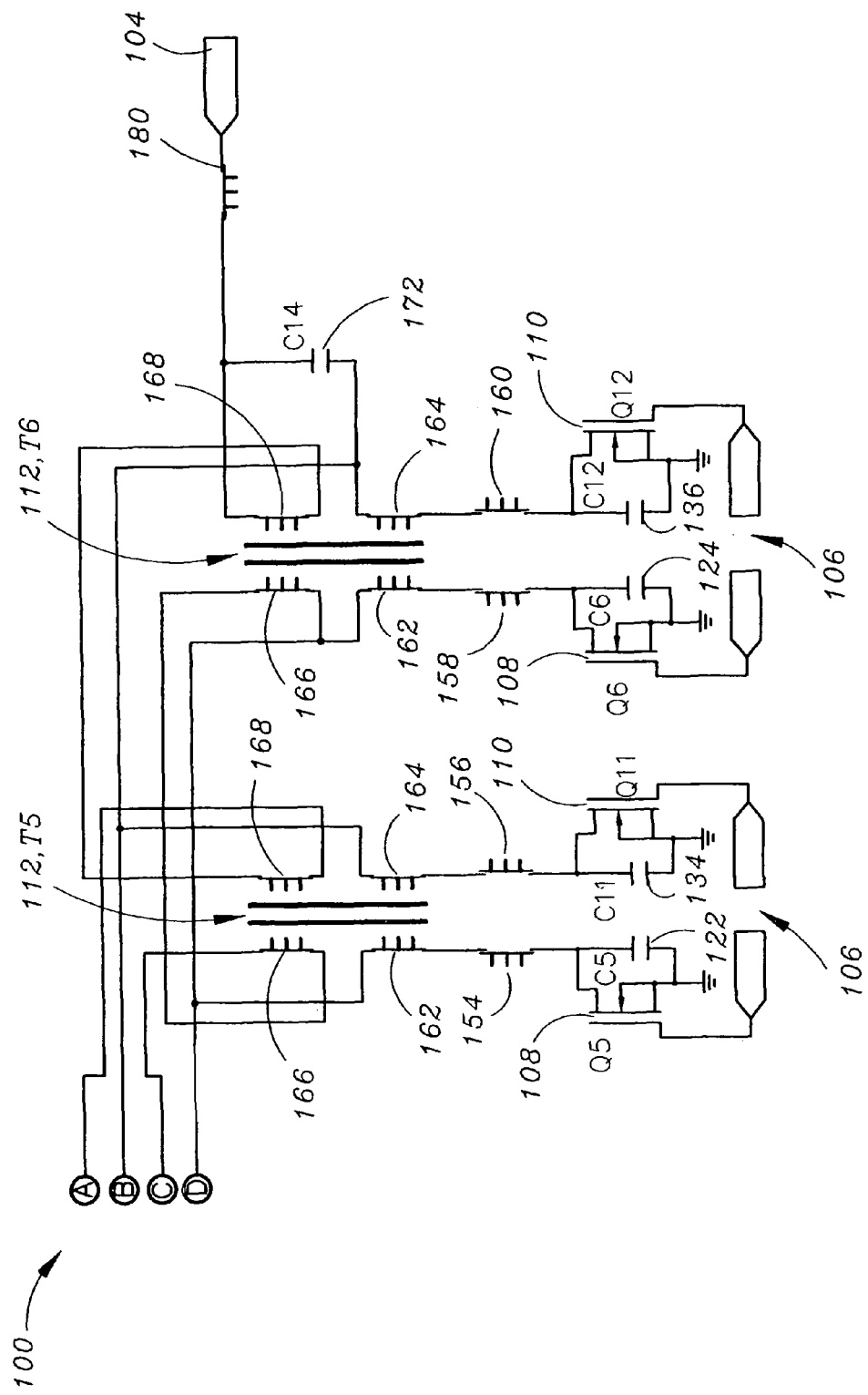

Referring to FIGS. 1A and 1B, a system/circuit/converter circuit/power converter/power modulator in accordance with an exemplary embodiment of the present invention is shown. In a current embodiment of the present invention, the power modulator 100 is a multi-phase resonant power modulator. The power modulator 100 includes an input 102 and an output 104. The input 102 is configured for receiving an input voltage/input power/power input (ex.—a Direct Current (DC) input). The output 104 is configured for providing an output signal/modulated power output (ex.—a modulated signal) based on the power input. In further embodiments, the power modulator 100 includes a plurality of power switch-rectifier sets 106 (ex.—switch-rectifier pairs 106 provided as a polyphase array) connected between the input 102 and the output 104 (ex.—said switch-rectifier pairs being connected to each other and also being connected to the input 102 and the output 104). For example, the power modulator 100 in the illustrated embodiment includes six, dual-resonant power pairs 106.

In exemplary embodiments, each of the plurality of switch-rectifier pairs 106 may include a switch 108. For example, if six switch-rectifier pairs 106 are being implemented, the power modulator/power converter 100 may include six switches 108 (ex.—Q1 through Q6) connected to each other. Further, the switches 108 may be Metal-oxide-semiconductor field-effect transistor (MOSFET) switches. In additional embodiments, each MOSFET switch 108 may be provided with a drive mechanism (ex.—a drive signal(s))/may be configured for being driven into conduction for a nominal one-hundred eighty degrees per operating cycle. The switches 108 may be further configured such that a first set of drive signals are provided to the switches 108, wherein drive signal(s) provided to each successive switch may be delayed by a phase angle equal to the following quotient:

three hundred-sixty degrees/the number of MOSFET switches

For example, if six switches 108 are being implemented, the drive signal(s) provided to each successive switch may be delayed by a phase angle equal to sixty degrees, so that the drive signals to each MOSFET/switch 108 are equally distributed over three hundred-sixty degrees of one switching cycle. Collectively, the switches 108 may form/may be included as part of a primary-side switch circuit/sub-circuit of the power modulator 100.

In further embodiments, each of the plurality of switch-rectifier pairs 106 of the power modulator 100 may further include a rectifier 110. For example, if six switch-rectifier pairs 106 are being implemented, the power modulator/power converter 100 may include six rectifiers 110 (ex.—Q7 through Q12) connected to each other. Further, the rectifiers 110 may be MOSFET synchronous rectifiers 110. In additional embodiments, each rectifier 110 may be provided with a drive signal(s)/may be configured for being driven by a second set of drive signal(s), wherein drive signal(s) provided to each successive rectifier 110 may be delayed by a phase angle equal to the following quotient:

three hundred-sixty degrees/the number of rectifiers

For instance, if six MOSFET synchronous rectifiers 110 are being implemented, the drive signal(s) provided to each successive rectifier may be delayed by a phase angle equal to sixty degrees. The second set of drive signals may be equally distributed to the MOSFET rectifiers 110 over three hundred-sixty degrees of a switching cycle. Collectively, the rectifiers 110 may form/may be included as part of a secondary-side switch circuit/sub-circuit of the power modulator 100.

In exemplary embodiments, the rectifiers 110 and switches 108 are connected such that a phase relationship between the drive signals of the primary-side MOSFET switches 108 (ex.—the first set of drive signals) and the drive signals of the secondary-side synchronous rectifiers 110 (ex.—the second set of drive signals) may be independently controllable over a one hundred-eighty degree angle, through which an output current of the secondary-side rectifier circuit and an output voltage of the secondary-side rectifier circuit is controllable. The output voltage of the circuit will be determined both by the input voltage of the circuit, and the drive signal phase difference of each primary-side switch and secondary-side switch.

In further embodiments, each switch-rectifier pair 106 may be associated with/connected to a corresponding coupling transformer included in a plurality of coupling transformers 112. For example, in the illustrated embodiment, there are six transformers 112 (ex.—T1 through T6). The transformers 112 are connected to each other, and further, are connected to the switches 108 and rectifiers 110. Further, the transformers 112 are configured for coupling a switch-frequency energy to the rectifier(s)/rectifier circuitry 110. In additional embodiments, the transformers are configured for transforming primary/secondary voltage ratio(s) as necessary.

In exemplary embodiments, each MOSFET, whether a primary-side switch 108 or a secondary-side rectifier 110 may be provided by a capacitance(s) (via a plurality of capacitors 114, 116, 118, 120, 122, 124, 126, 128, 130, 132, 134, 136 (ex.—twelve capacitors, $C_1$ through $C_{12}$) shunting the drain-source terminals of the individual MOSFET. The capacitance(s) may be partially or wholly comprised of the internal capacitance Coss of the MOSFET device (ex.—switch 108 and/or rectifier 110).

In current embodiments of the present invention, inductances (provided via a plurality of inductors 138, 140, 142, 144, 146, 148, 150, 152, 154, 156, 158, 160) (ex.—twelve inductors, $L_{1a}$, $L_{1b}$, $L_{2a}$, $L_{2b}$, etc.) are associated with each switch-rectifier set 106, said inductances serving to resonate the MOSFET shunt capacitances and to permit lossless switching. The inductances may be formed partially or wholly from leakage inductance(s) of an associated coupling transformer(s) 112. Because core losses of the transformers T1, T2, etc., may result in a reduction to the efficiency of the circuit, these core losses being proportional to the square of the amplitude of RF magnetic flux, it may be preferable to minimize the RF magnetic flux in the transformer cores. This may be attained by placing the bulk of the inductance for each switch rectifier set on the primary side (ex.—L1a, L2a, etc.). This may result in a larger fraction of the resonant switching waveform voltage being supported across the inductor, rather than the transformer.

In further embodiments of the present invention, each transformer 112 includes a number of windings. In exemplary embodiments, each transformer 112 includes a primary winding 162 (ex.—T1a, T2a, etc.), a secondary winding 164 (ex.—T1b, T2b, etc.), a tertiary winding 166 and a quarternary winding 168. In the illustrated embodiment, one terminal of each transformer primary winding 162 may be connected to a first common star point. Further, one terminal of each secondary winding 164 is connected to a second common star point. As shown in FIGS. 1A and 1B, the primary windings 162 and the secondary windings 164 of the coupling transformers 112 may be connected in a manner analogous to a wye connection implemented in three-phase AC power circuitry, with power input and output through a neutral point of the respective wye circuits. Within three-phase AC power transformer practice, a three-phase transformer with wye-configured primary and secondary circuits may suffer from neutral instability. An isolated, tertiary winding configured in a delta circuit may be added. A three-phase transformer configured in a delta-wye configuration may have its neutral voltage bound to a value which is the arithmetic mean of the three input phase voltages.

In exemplary embodiments, it may be desired that neutral star voltage of the transformer(s) 112/transformer circuitry have minimal ripple voltage, said ripple voltage being the arithmetic mean of the voltages of each MOSFET switch 108. Consequently, each of the transformers 112 may be provided with the tertiary windings 166 and the quarternary windings 168, each series being connected with that of its adjacent transformer 112 to form a multi-phase analogy of a delta connected circuit, said connection forcing neutral star point voltage of the primary-side switch circuit/sub-circuit and neutral star point voltage of the secondary-side rectifier circuit/sub-circuit to possess a minimal amount of ripple voltage.

In current embodiments of the present invention, each transformer 112 may have an open-circuit impedance which is significantly larger than its fraction of the load impedance. Further, each transformer 112 may be configured to have low losses at its frequency of operation. In exemplary embodiments, each transformer 112 may be fabricated on a ferro-magnetic core possessing a closed magnetic path (ex.—a ferrite material). The power modulator/power converter 100 of the present invention may be configured for preventing magnetic saturation of the magnetic core by maintaining zero net magnetic flux and zero net current through each transformer 112. For example, this may be achieved by passing the DC current into and out of the primary star point(s)/first common star point(s) and the secondary star point(s)/second common star point(s), through the series-connected tertiary windings 166 and quarternary windings 168 respectively, such that a sum current in all windings per transformer core averages to zero over a complete switching cycle.

Figure 2A:
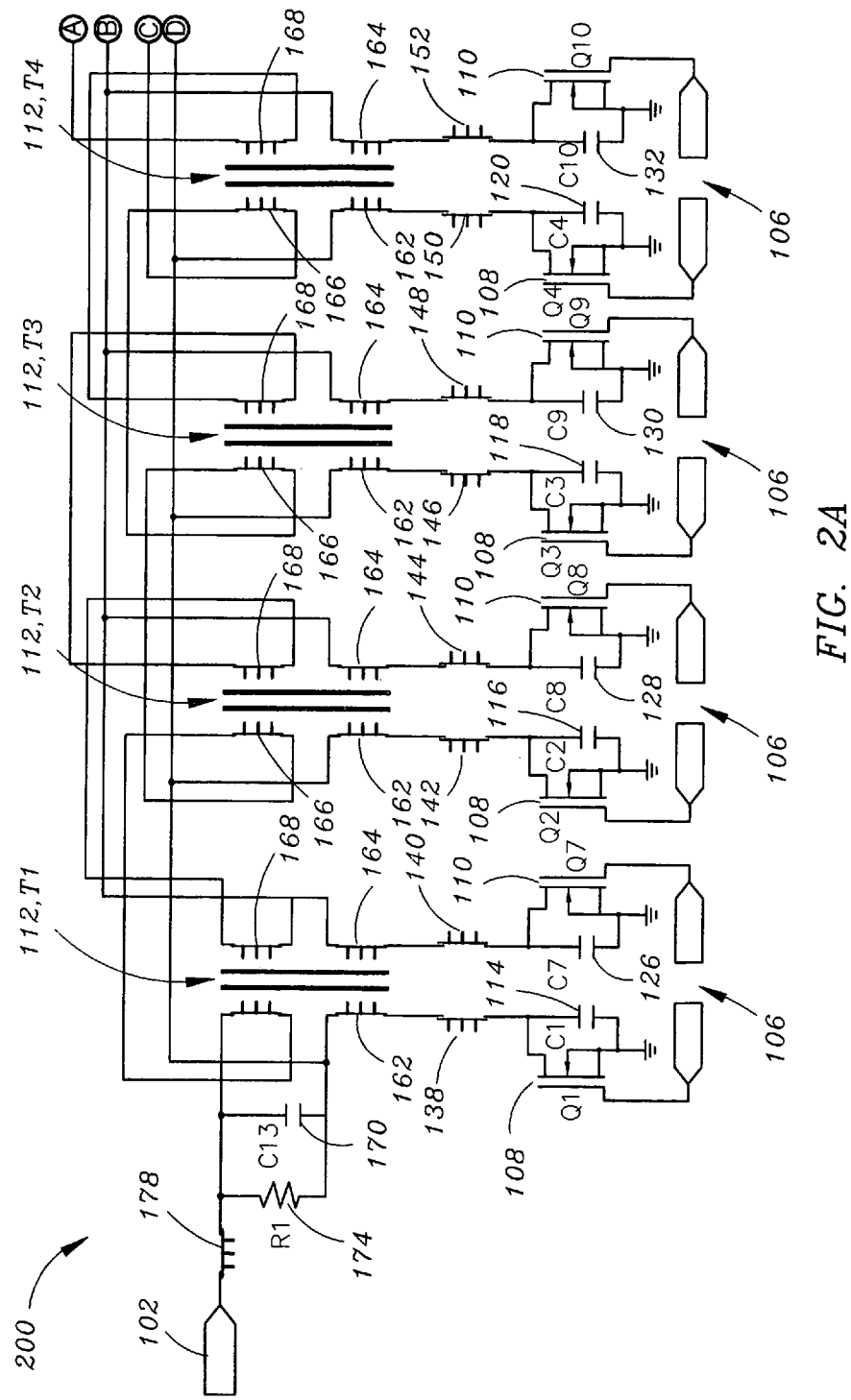
FIGS. 2A and 2B are a block diagram schematic of a multi-phase resonant power modulator implementing current balancing shunts in accordance with a further exemplary embodiment of the present invention.
Figure 2B:
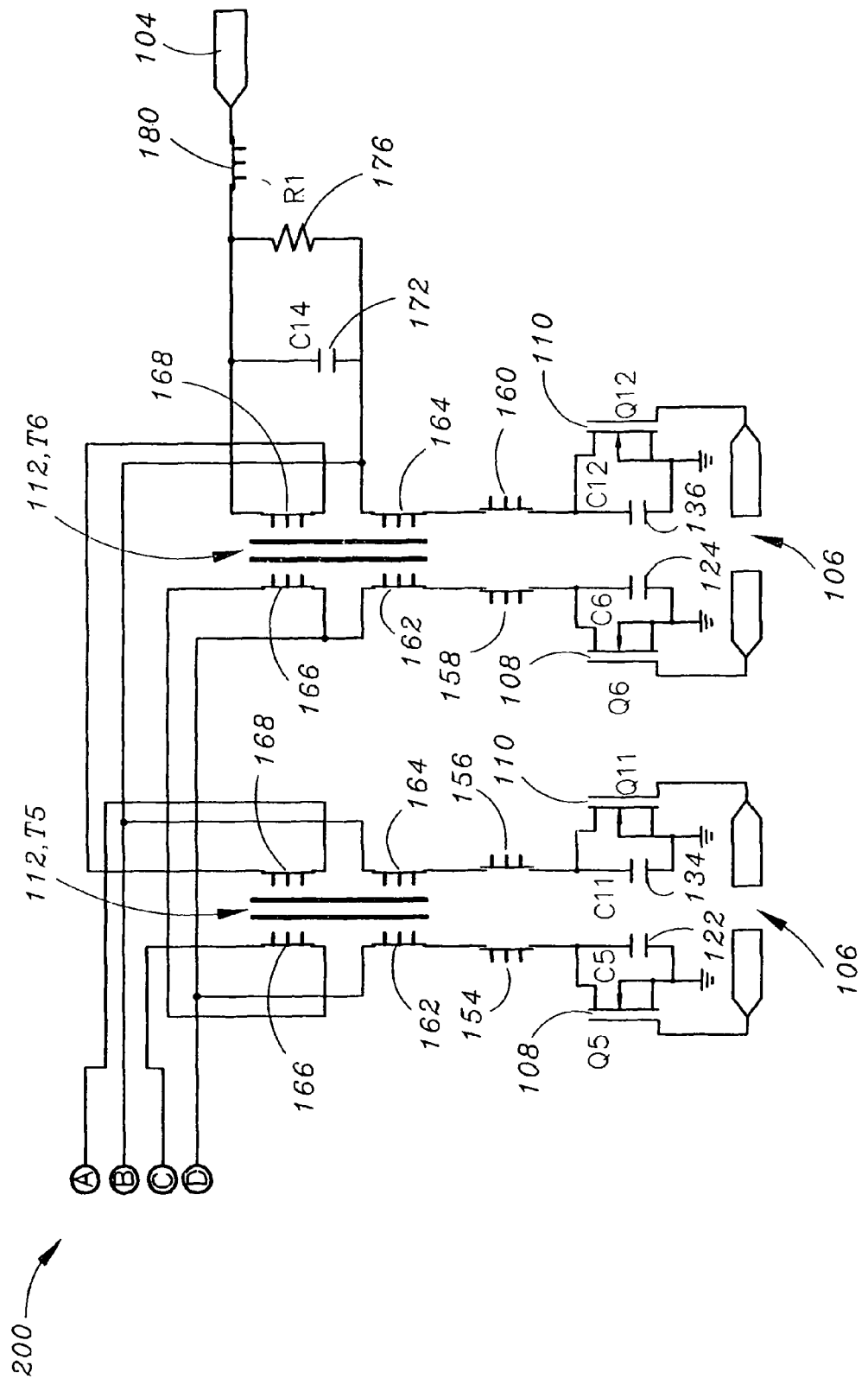

In further embodiments, the power modulator/power converter 100 may also include a plurality of low RF-impedance capacitors 170, 172 (ex.—$C_{13}$ and $C_{14}$) connected to the transformers 112. The low RF-impedance capacitors 170, 172 may be provided so that a circuit possessing low impedance at the switching frequency is provided for the delta circuit. To provide the requisite balance, the transformers 112 are configured such that the ratio of turns between the primary windings 162 and the tertiary windings 166, and the ratio of turns between the secondary windings 164 and the quarternary windings 168 may be n:1 (wherein n=the number of switch-rectifier sets or switch-rectifier pairs). In the illustrated embodiment, the ratio of turns between the primary windings 162 and the tertiary windings 166, and the ratio of turns between the secondary windings 164 and the quarternary windings 168 may be 6:1. In further embodiments, where the number of windings in the primary and/or secondary of each of the transformers 112 may not be whole-number multiples of n, it may be possible to shunt or replace the low RF-impedance capacitors 170, 172 with resistances of appropriate value (via resistors 174, 176, as shown in FIGS. 2A and 2B which depict an alternative embodiment of a power modulator 200 of the present invention) such that the DC input current and the DC output current is split between the low RF impedance capacitors 170, 172 and the series-connected tertiary windings 166 and quarternary windings 168 to maintain a proper current and flux balance in the transformer cores.

In exemplary embodiments, the power converter/power modulator 100 may further include a plurality of filter inductors, including a first filter inductor 178 (ex.—an input filter choke) and a second filter inductor 180 (ex.—an output filter choke). The first filter inductor 178 may be configured for blocking RF current flow from the input 102 of the power modulator/power converter 100. The second filter inductor 180 may be configured for blocking RF current flow from the output 104 of the power modulator/power converter 100. The filter inductors 178, 180 may include/may be formed of paralleled leakage inductances provided by the inductors 138, 140, 142, 144, 146, 148, 150, 152, 154, 156, 158, 160 of the circuit 100. Alternatively, such as in embodiments where n (ex.—the number of combined switch-rectifier pairs 106) exceeds six, the amplitude and frequency of the ripple voltage at an input star point and an output star point of the circuit 100 may be such that no external inductors (ex. 138 through 160) are required for the first filter inductor 178 and the second filter inductor 180.

In current embodiments of the present invention, a maximum bandwidth attainable by the circuit/power modulator 100 may be initially limited by inductance values provided by the first filter inductor 178 and the second filter inductor 180 and the impedances of the first filter inductor 178 and the second filter inductor 180 versus the value of the load. The maximum bandwidth attainable by the circuit/power modulator 100 may further be limited by a degree necessary for attenuation of switching frequency ripple from the modulator output. If the number, n, is sufficiently large so as to render the output ripple insignificant, the sole limitation of the bandwidth of this circuit 100 is the low-pass effect of the circuits comprised of the MOSFET shunt capacitances and resonator inductors (138 through 160). Generally, a −3 dB point for operational bandwidth may then be approximately one-half the switch frequencies at which the MOSFETs are driven.

Nominal ideal values of the above-referenced passive components may be provided by the following set of equations, such that:

$V_{in}$=a nominal voltage input to the converter circuit/power modulator n=number of switch-rectifier pairs $V_{outmax}$=maximum output voltage desired of the power modulator $I_{outmax}$=maximum output current desired of the power modulator f=nominal operating frequency of the MOSFET switches L7=the input choke (designated by reference numeral 178 above)

L8=the output choke (designated by reference numeral 180 above)

the transformer primary-to-secondary turns ratio,
$$n_p/n_s = V_{in}/V_{outmax}$$

$$C_{2n+1}, C_{2n+2} = 0.283 * I_{outmax}/V_{outmax}/f/(n_p/n_s)^2/n$$

$$C_n, C_{n+1} = 0.283 * I_{outmax}/V_{outmax}/f/n$$

$$L_n a * (n_p/n_s)^2 + L_n b = 4.52 * V_{outmax}/I_{outmax}/f * n$$

$$L7 > 3 * (n_p/n_s)^2 * (L_n a * (n_p/n_s)^2 + L_n b)/n^2$$

$$L8 > 3 * (L_n a * (n_p/n_s)^2 + L_n b)/n^2$$

Modeling drain voltage on each synchronous rectifier MOSFET 110 as a half-sinusoid, it may be possible to estimate a frequency and amplitude of a ripple present at an output of the transformer secondary star point. FIG. 3 includes a table which charts normalized output ripple and frequency versus number of switches implemented in the circuit. As the table in FIG. 3 illustrates, a particular advantage may be attained in the case where there are an odd number of switch-rectifier pairs 106. Further, the table in FIG. 3 also illustrates that the amplitude of the ripple voltage at the star point of the transformer circuit/transformer circuitry may diminish by a factor proportional to $n^3$, but at a rate approximately 12 times faster for a system with an odd number of switches 108. In the present invention, transformer circuit/transformer circuitry may be/may be defined as an integrated transformer structure which may include a combination of one or more of: coupling transformers 112, resonant inductors (138 through 160), input filter choke(s) 178 and/or output filter chokes 180. Still further, the ripple frequency of a system 100 with an odd number (which is greater than 1) of switches may have its ripple frequency multiplied by double the number of switches 108. A system 100 with an even number of switches may have its ripple frequency multiplied simply by the number of switches. Consequently, the set of equations defining the prototype component values for the circuit may be modified as follows:

The input choke (L7), and the output choke (L8) may be redefined as follows:

$$L7 > 225 * (n_p/n_s)^2 * (L_n a * (n_p/n_s)^2 + L_n b)/n^4$$

$$L8 > 225 * (L_n a/(n_p/n_s)^2 + L_n b)/n^4$$

for an even number of switches, and:

$$L7 > 9 * (n_p/n_s)^2 * (L_n a * (n_p/n_s)^2 + L_n b)/n^4$$

$$L8 > 9 * (L_n a/(n_p/n_s)^2 + L_n b)/n^4$$

for an odd number of switches.

The power converter/power modulator 100 of the present invention allows for power conversion with substantial reduction of input and output ripple signals, thereby reducing the requirement for input and output low-pass filtering, thus permitting the bandwidth of this power modulator to approach the operating frequency of the switching devices.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A power converter, comprising:
   an input configured for receiving an input power;
   an output configured for providing a modulated signal based upon the received input power;
   a plurality of power switch-rectifier pairs connected between the input and the output; and
   a plurality of coupling transformers connected to the plurality of power switch-rectifier pairs, each of the plurality of coupling transformers including a primary winding, a secondary winding, a tertiary winding, and a quarternary winding, a tertiary winding of a first transformer included in the plurality of transformers being series-connected with a tertiary winding of a second transformer included in the plurality of transformers, a quarternary winding of a first transformer included in the plurality of transformers being series-connected with a quarternary winding of a second transformer included in the plurality of transformers
   wherein the series-connected tertiary windings and the series-connected quarternary windings are configured for promoting a reduction of ripple voltage in a neutral star point voltage of the power converter.

2. A power converter as claimed in claim 1, wherein the power switch-rectifier pairs are dual-resonant.

3. A power converter as claimed in claim 1, wherein the power switch-rectifier pairs are configured as a polyphase array.

4. A power converter as claimed in claim 1, wherein each power switch-rectifier pair included in the plurality of power switch-rectifier pairs includes a Metal-oxide-semiconductor field-effect transistor (MOSFET) switch and a MOSFET synchronous rectifier.

5. A power converter as claimed in claim 4, wherein the MOSFET switches are connected to form a primary-side switch sub-circuit and are configured for being driven by a first set of drive signals.

6. A power converter as claimed in claim 5, wherein the MOSFET rectifiers are connected to form a secondary-side rectifier sub-circuit and are configured for being driven by a second set of drive signals.

7. A power converter as claimed in claim 5, wherein the first set of drive signals are equally distributed to the MOSFET switches over three hundred sixty degrees of a switching cycle.

8. A power converter as claimed in claim 6, wherein the second set of drive signals are equally distributed to the MOSFET rectifiers over three hundred sixty degrees of a switching cycle.

9. A power converter as claimed in claim 7, wherein a phase relationship between the first set of drive signals and the second set of drive signals is independently controllable over a one hundred eighty degree angle via which an output current and an output voltage provided by the secondary-side rectifier sub-circuit is controllable.

10. A power converter as claimed in claim 9, wherein the plurality of coupling transformers are configured for coupling a frequency energy of the switch sub-circuit to the rectifier sub-circuit.

11. A power converter as claimed in claim 10, wherein the plurality of coupling transformers are further configured for transforming a primary/secondary voltage ratio of the power converter.

12. A power converter as claimed in claim 1, wherein a MOSFET switch included in the plurality of MOSFET switches is provided by a capacitance shunting drain-source terminals of the switch.

13. A power converter as claimed in claim 12, wherein the capacitance includes internal capacitance Coss of the MOSFET switch.

14. A power converter as claimed in claim 13, wherein an inductance is associated with the MOSFET switch and serves to resonate the capacitance of the MOSFET switch for providing lossless switching.

15. A power converter, comprising:
   an input configured for receiving an input power;
   an output configured for providing a modulated power output based upon the received input power;
   a plurality of power switch-rectifier pairs connected between the input and the output;
   a plurality of coupling transformers connected to the plurality of power switch-rectifier pairs, each of the plurality of coupling transformers including a primary winding, a secondary winding, a tertiary winding, and a quarternary winding, a tertiary winding of a first transformer included in the plurality of transformers being series-connected with a tertiary winding of a second transformer included in the plurality of transformers, a quarternary winding of a first transformer included in the plurality of transformers being series-connected with a quarternary winding of a second transformer included in the plurality of transformers; and
   a plurality of low RF-impedance capacitors connected to the plurality of coupling transformers at the tertiary windings and the quarternary windings of the transformers, the low RF-impedance capacitors configured for allowing the power converter to possess low impedance at a switching frequency of the power converter, wherein the series-connected tertiary windings and the series-connected quarternary windings are configured for promoting a reduction of ripple voltage in a neutral star point voltage of the power converter.

16. A power converter as claimed in claim 15, wherein the power switch-rectifier pairs are dual-resonant.

17. A power converter as claimed in claim 15, wherein the power switch-rectifier pairs are configured as a polyphase array.

18. A power converter as claimed in claim 15, wherein each power switch-rectifier pair included in the plurality of power switch-rectifier pairs includes a Metal-oxide-semiconductor field-effect transistor (MOSFET) switch and a MOSFET synchronous rectifier.

19. A power converter as claimed in claim 15, wherein a MOSFET switch included in the plurality of MOSFET switches is provided by a capacitance shunting drain-source terminals of the switch.

20. A power converter circuit, comprising:
an input;
an output;
a plurality of power switch-rectifier pairs connected between the input and the output;
a plurality of coupling transformers connected to the plurality of power switch-rectifier pairs, each of the plurality of coupling transformers including a primary winding, a secondary winding, a tertiary winding, and a quarternary winding, a tertiary winding of a first transformer included in the plurality of transformers being series-connected with a tertiary winding of a second transformer included in the plurality of transformers, a quarternary winding of a first transformer included in the plurality of transformers being series-connected with a quarternary winding of a second transformer included in the plurality of transformers;
a plurality of filter inductors, said filter inductors connected to the plurality of coupling transformers, said filter inductors configured for blocking RF current flow from the input and the output of the power converter circuit;
a plurality of low RF-impedance capacitors connected to the plurality of coupling transformers at the tertiary windings and quarternary windings of the transformers, the plurality of low RF-impedance capacitors configured for allowing the power converter circuit to possess low impedance at a switching frequency of the power converter circuit; and
a plurality of resistors connected to the plurality of low RF-impedance capacitors, wherein the capacitors are shunted with resistances of the plurality of resistors for splitting an input current and an output current between the resistors and the tertiary and quarternary windings of the first and second transformers for promoting current and flux balance in cores of the first and second transformers
wherein the series-connected tertiary windings and the series-connected quarternary windings are configured for promoting a reduction of ripple voltage in a neutral star point voltage of the power converter circuit.

* * * * *